US008910946B2

(12) United States Patent  (10) Patent No.: US 8,910,946 B2
Meller  (45) Date of Patent: Dec. 16, 2014

(54) ROTARY OIL FEEDTHROUGH

(75) Inventor: Dieter Meller, Alfter (DE)

(73) Assignee: GAPI Technische Produkte GmbH, Rösrath (DE)

( * ) Notice: Subject to any disclaimer, the term of this patent is extended or adjusted under 35 U.S.C. 154(b) by 394 days.

(21) Appl. No.: 12/841,707

(22) Filed: Jul. 22, 2010

(65) Prior Publication Data

US 2011/0018208 A1 Jan. 27, 2011

(30) Foreign Application Priority Data

Jul. 23, 2009 (DE) ............... 20 2009 010 047 U (51) Int. Cl.
  *F16J 15/34* (2006.01)
  *F16L 27/087* (2006.01)
  *F16J 15/40* (2006.01)
(52) U.S. Cl.
  CPC ............ *F16L 27/087* (2013.01); *F16J 15/34* (2013.01); *F16J 15/40* (2013.01)
  USPC .......................................... 277/408; 277/431
(58) Field of Classification Search
  CPC ............ F16J 15/34; F16J 15/40; F16J 15/54
  USPC ................. 277/401, 408, 431, 512
  See application file for complete search history.

(56) References Cited

U.S. PATENT DOCUMENTS

| | | | |
|---|---|---|---|
| 875,934 A * | 1/1908 | King | 277/346 |
| 2,310,309 A | 2/1943 | Orr | |
| 3,285,614 A | 11/1966 | McClenathan | |
| 3,333,856 A | 8/1967 | Voitik | |
| 4,202,553 A * | 5/1980 | Kropp | 277/366 |
| 6,439,044 B1 * | 8/2002 | Tigges | 73/146.2 |
| 6,561,515 B1 * | 5/2003 | Bjornson | 277/358 |

FOREIGN PATENT DOCUMENTS

| | | |
|---|---|---|
| DE | 19502079 A1 | 7/1996 |
| GB | 2297363 A | 7/1996 |

OTHER PUBLICATIONS

Int'l Search Report issued Nov. 5, 2010 in Int'l Application No. PCT/EP2010/060230.

* cited by examiner

*Primary Examiner* — Vishal Patel
(74) *Attorney, Agent, or Firm* — Panitch Schwarze Belisario & Nadel LLP (57) ABSTRACT

A rotary oil feedthrough is provided for sealing off a pressurized oil compartment between a rotatable shaft and a shaft mount, where the rotary oil feedthrough displays a radial oil passage for connecting an oil duct of the shaft and/or the mount to the pressurized oil compartment in fluid-permeable fashion, and has a seal arrangement that seals off the pressurized oil compartment on both sides in the axial direction of the shaft. The rotary oil feedthrough displays a sealing ring carrier that can be fastened to the shaft or the mount in non-rotating and fluid-tight fashion, the sealing ring carrier being arranged coaxially to the shaft or the mount, and an adapter that can be positioned on the other component of shaft and mount in fluid-tight fashion, and is surrounded laterally by the sealing ring carrier in the axial direction of the shaft. Located between sealing ring carrier and adapter are two axially separated sealing rings that each lie on the sealing ring carrier and the adapter in sealing fashion in order to seal off the pressurized oil compartment in the axial direction of the shaft, and that can be rotated relative to the sealing ring carrier and/or the adapter. The rotary oil feedthrough displays the longest possible service life, the minimum possible leakage, and good response characteristics, and is of simple structural design.

28 Claims, 5 Drawing Sheets

ROTARY OIL FEEDTHROUGH

BACKGROUND OF THE INVENTION

The invention relates to a rotary oil feedthrough for sealing off a pressurized oil compartment between a rotatable shaft and a shaft mount, where the rotary oil feedthrough displays a radial oil passage for connecting an oil duct of the shaft and/or the mount to the pressurized oil compartment in fluid-permeable fashion, and has a seal arrangement that seals off the pressurized oil compartment on both sides in the axial direction of the shaft.

Generic rotary oil feedthroughs are put to diverse uses, mainly in applications involving a rotary hollow shaft whose cavity forms an oil duct. In this context, the space between the shaft and the mount assigned to it is filled with oil that is usually pressurized. Where appropriate, the mount surrounding the shaft can in turn be connected to the oil-containing pressurized compartment between the shaft and the mount in fluid-permeable fashion, and the mount itself can generally be designed as a hollow shaft. The oil ducts of the shaft and the mount can be connected in fluid-carrying fashion via the pressurized oil compartment. The pressurized oil compartment between the shaft and the mount is axially sealed off towards the outside by two separated sealing rings that are thus located on both sides of the oil supply ducts of the shaft and/or the mount running into the pressurized oil compartment. Rotary oil feedthroughs of this kind can be used in transmissions, but also for other applications.

The rotary oil feedthrough must satisfy stringent tightness requirements, even at high relative speeds of the shaft in relation to the mount, high pressures or pressure fluctuations, and high temperatures or temperature fluctuations. Up to now, rectangular rings made of steel or plastic have mostly been used as the sealing rings on rotary oil feedthroughs of this kind, since the otherwise customary lip seals cannot be considered because of the high operating temperatures. For sealing in relation to the respective components, the rectangular rings are hydraulically pressed against these components. The axial (lateral) boundary surface of the sealing ring then lies under hydraulic pressure on the groove flank of the component receiving the sealing ring. At the high rpm speeds to which shafts used with rotary oil feedthroughs of this kind are usually exposed, this results in substantial frictional forces on the sealing ring, which lead to substantial temperature increases on the friction surface or the sealing surface of the sealing ring. Cooling with leakage oil is necessary to avoid overheating of the respective components on the friction surfaces. However, at very high oil pressures—and thus high contact pressures of the sealing ring on the sealing surface of the respective component—and high relative speeds, the result of this is that a relatively large quantity of cooling oil is needed as the leakage flow, meaning that the actual function of the seal arrangement is significantly impaired. Since a large number of rotary oil feedthroughs may be present in a machine, such as a transmission, the overall frictional losses of the individual rotary oil feedthroughs also lead to significant performance losses of the respective machine, such as a motor with transmission.

The high relative rotational speeds of the sealing ring in relation to the components lying on it in sealing fashion are particularly critical as regards the tightness of the rotary oil feedthrough, meaning that excessive relative speeds must be avoided. On the other hand, the relative speeds have a major influence on the design of the sealing ring receiving groove, the surface quality of the sealing surfaces, and the material quality and hardness of the components in the region of the sealing surfaces. As a result, it is often necessary to use hardened materials in the region of the sealing surfaces. If, for example, aluminum shafts or mounts are used, the respective sealing surfaces usually have to consist of hardened, e.g. anodized, aluminum in order to have sufficient durability. Furthermore, the grooves, against the groove flanks of which the sealing ring can be positioned in sealing fashion, usually have to be of relatively small design, in which context it is usually difficult to gain access to the groove flanks, meaning that their machining is then also complicated. It is then generally also difficult to check the quality of manufacture of the sealing surfaces.

Furthermore, rotary oil feedthroughs of this kind are supposed to display good response characteristics, i.e. the oil leakage should be minimized as soon as possible when the oil pressure rises. This is only possible within limits on conventional rotary oil feedthroughs.

BRIEF SUMMARY OF THE INVENTION

The object of the invention is therefore to provide a rotary oil feedthrough that displays the longest possible service life, the minimum possible leakage, and good response characteristics, and that is of a simple structural design.

The object is solved by a rotary oil feedthrough of the type described at the outset, where the sealing ring carrier can be fastened, or is fastened, to the shaft or the mount in non-rotating and fluid-tight fashion, where the sealing ring carrier is arranged coaxially to the shaft or the mount, where an adapter is provided that can be positioned, or is positioned, on the other component of shaft and mount in fluid-tight fashion, and is surrounded laterally, preferably bilaterally, by the sealing ring carrier, and where, between sealing ring carrier and adapter, preferably on both sides of the oil feedthrough, two axially separated sealing rings are located that lie on the sealing ring carrier and the adapter in sealing fashion in order to seal off the pressurized oil compartment in the axial direction of the shaft, and that can be rotated relative to the sealing ring carrier and/or the adapter. In this context, "fluid-tight" is taken to mean that, under operating conditions, the respective connection is oil-tight or only permits leakage that at least essentially does not impair the functional capacity of the rotary oil feedthrough or the associated device.

Rotary relative motion between the components fastened to each other is avoided or reduced by the fact that the sealing ring carrier and also, where appropriate, the adapter are seated on the shaft or fitted in the mount in essentially non-rotating fashion. This avoids frictional losses within the rotary oil feedthrough. Due to the non-rotating connection of the sealing ring carrier and, where appropriate, the adapter to the respective components, the entire relative rotary motion of the seal arrangement is absorbed by the sealing rings, possibly apart from a tolerable slip of the adapter relative to the component holding it. A tolerable slip preferably does not affect the fluid-tight connection of the adapter to the component, or not to a degree that would impair the functional capacity of the associated machine or device. As a result, the rotary feedthrough system is moreover easy to assemble and can be of robust design. Furthermore, this allows particularly simple and flexible adaptation of the sealing ring geometry to the respective requirements. In this context, the sealing ring carrier can be mounted on a smooth shaft and/or the adapter fitted in a smooth mount. This eliminates costs for the complicated production of grooves on the respective components, and assembly is reduced to the non-rotating location of the sealing ring carrier and the adapter on the corresponding components. Wear and internal frictional losses are also greatly reduced as a result.

The sealing ring carrier can preferably be directly fastened to the respective component of shaft and mount in non-rotating fashion, and connected to it in fluid-tight fashion. The adapter can preferably be directly fastened to the respective component of shaft and mount, and connected to it in fluid-tight fashion. The adapter can generally be connected to said respective component in non-rotating fashion, or preferably with a clamping force that is smaller than the clamping force of the sealing ring carrier in relation to its fastening component (shaft or mount). Thus, if the sealing ring carrier presses indirectly or directly against the adapter in the axial direction, e.g. as a result of axial movement of the shaft, the adapter can be axially displaced in relation to its fastening component (e.g. the mount) and follow this movement, preferably maintaining fluid-tight contact of the adapter on its fastening component.

The rotary oil feedthrough according to the invention can be designed in such a way that it can be slid onto the shaft and/or into the mount, and fixed on the shaft and/or in the mount in non-rotating fashion, as a structural unit comprising sealing ring carrier, adapter and the two sealing rings located between the two components. To this end, the rotary oil feedthrough can be slid into the space between the shaft and the mount as an assembly in order to install it. Where appropriate, it is also possible to first slide the rotary oil feedthrough onto the shaft or into the mount, the respective other component of shaft and mount then being fastened to the rotary oil feedthrough in a second work step. Installation of the rotary oil feedthrough is particularly simple as a result.

The rotary oil feedthrough can be designed in such a way that, by sliding the sealing ring carrier axially onto the shaft and/or the adapter into the mount, said components can be fixed in place on the respectively corresponding components in fluid-tight fashion independently of each other. This fluid-tight fixing is maintained during normal operation of the device encompassing the rotary oil feedthrough.

The sealing ring carrier can be fixed in place on its fastening component (the mount, or preferably the shaft) in non-rotating fashion, preferably in a press fit. The adapter can by fixed in place on its fastening component (e.g. the mount) in a press fit, the clamping force preferably being smaller than that of the sealing ring carrier on its fastening component, such that the adapter can be axially displaced together with the sealing ring carrier in the event of axial displacement of the latter. Where appropriate, the press fit can also be of an at least essentially non-rotating nature.

The press fit can in each case preferably be created by sliding the sealing ring carrier or the adapter onto or into the corresponding component, preferably exclusively in this manner. Where appropriate, it can also alternatively or additionally be created by exerting radial pressure on the sealing ring carrier or the adapter. The sealing ring carrier and/or the adapter are preferably fastened on the shaft by direct clamping. The sealing ring carrier and/or the adapter are preferably fastened on the shaft exclusively by a clamping action. The press fit is preferably designed in such a way that it simultaneously creates a fluid or oil-tight connection between the sealing ring carrier and/or the adapter and the respectively corresponding component of shaft and mount. Preferably, no other components, such as retaining rings, sealing elements, etc., are necessary for fastening and/or fluid-tight sealing of the sealing ring carrier and/or the adapter in relation to the respectively corresponding components of shaft and mount.

Where appropriate, a slight amount of slip can exist between the adapter and the component on which it is fastened (preferably the mount), at least under certain operating conditions, such that the relative speed of the sealing ring carrier and the adapter in relation to each other is then smaller than that of the shaft and the mount in relation to each other. Where appropriate, the adapter can thus also be mounted in "floating" fashion, always presupposing that the adapter is fixed in place on the corresponding component, i.e. the mount or the shaft, in at least essentially fluid-tight fashion. As a result, the adapter can follow axial movements of the sealing ring carrier, for example.

The rotary movement between shaft and mount is thus at least essentially completely absorbed by the sealing rings, i.e. by rotary movement of the sealing rings relative to the sealing ring carrier and/or the adapter. The rotary movement between shaft and mount can be absorbed, at least partly or essentially completely, by one of the two sealing surfaces of the respective sealing ring (e.g. the contact surface opposite the adapter), where the other sealing surface of this sealing ring (e.g. the contact surface opposite the sealing ring carrier) performs less or no rotary movement relative to the corresponding component; the former of the two sealing ring surfaces can have a larger cross-sectional width than the latter.

The sealing ring is preferably designed in such a way that its sealing surfaces interacting with the sealing ring carrier and the adapter are arranged at an angle to each other, particularly an angle of less than 90°. The angle between the two sealing surfaces of the sealing ring can be 20-80°, preferably 30-60°, more preferably 40-50°, or approx. 45°. This means that, for example, the sealing ring can easily be adapted the respective requirements, and the complicated manufacture of rectangular grooves to accommodate the sealing ring can be dispensed with. Moreover, selection of the angle enclosed by the sealing surfaces of the sealing ring makes it possible to optionally set the distribution of the contact force of the sealing ring on the sealing ring carrier and the adapter at a given oil pressure. With a given surface quality of the respective contact surfaces, this means that the relative speeds of the rotation of the sealing ring in relation to the sealing ring carrier or the adapter can then be set.

The two sealing rings are thus preferably received by grooves consisting of the sealing ring carrier and the adapter, where the areas of the two components that form the groove are preferably free of undercuts. The groove flanks of the sealing ring carrier and/or the adapter, preferably of the adapter, that display a sealing surface can be inclined relative to a line perpendicular to the shaft axis (and also to the shaft axis itself). The adapter and the sealing ring carrier are generally designed as annular components.

The sealing ring arrangement is preferably designed in such a way that the sealing ring essentially performs no relative motion in relation to the adapter, or that the rotational speed of the sealing ring relative to the adapter is smaller than that relative to the sealing ring carrier. The relative rotational speeds can differ by a factor of ≥5, preferably ≥8-10, more preferably ≥20-30. This further reduces abrasion and wear.

If the two sealing rings each have a triangular cross-section, the largest cross-sectional side of the sealing ring can in each case lie in sealing fashion on the adapter, and the cross-sectional side located on the outside on the sealing ring can lie in sealing fashion on the sealing ring carrier. The triangular cross-section of the sealing ring can be of rectangular or isosceles design. In the case of a rectangular sealing ring, the hypotenuse can thus lie in sealing fashion on the adapter, the cathetus of the sealing ring located on the outside lying in sealing fashion on the sealing ring carrier. The cross-sectional side of the sealing ring lying on the sealing ring carrier can in each case be equal to or longer than the sealing ring side lying neither on the sealing ring carrier nor on the adapter, or also shorter than it, where appropriate. The sealing ring surfaces forming the seal preferably have a plane or slightly convex cross-section, and the free sealing ring surface (not forming a seal), usually the radially inner surface of the sealing ring, can have a plane, convex or concave cross-section, or be of a different design.

One of the sealing surfaces of the sealing ring, preferably the one that can be or is positioned on the adapter, can lie obliquely to a direction perpendicular to the axial direction of the shaft. One of the sealing surfaces of the sealing ring, preferably the one that can be or is positioned on the sealing ring carrier, can lie at least essentially parallel to a direction perpendicular to the axial direction of the shaft, e.g. be at an angle of ≤20-30°, preferably ≤5-10° to this direction.

In installed position, the surface of the sealing ring that cannot be positioned on the adapter or the sealing ring carrier, usually the radially inner side thereof, is pressurized by the oil pressure and presses the sealing ring against its sealing surfaces. This pressure-side surface can be parallel to the shaft axis or, for example, at an angle of ≤45°, preferably ≤20-30°, more preferably ≤5-10°.

The sealing surfaces of the sealing ring and the sealing ring carrier or the adapter can contact each other in plane fashion, preferably over the full surface.

The sealing rings are thus preferably located between the shaft and the mount at a radial distance from them.

The rotary oil feedthrough can be designed in such a way that the sealing ring carrier and the adapter are preferably capable of slight or no displacement relative to each other in the axial direction of the shaft (with or without consideration of an interaction or centering effect of the sealing ring with them). Where appropriate, the adapter and the sealing ring carrier can simultaneously lie against each other in both axial directions of the shaft, meaning that they are immobile relative to each other in the event of pressurization in the axial direction of the shaft (e.g. by the oil pressure or application of external force). The adapter is centered by the sealing ring carrier as a result. However, this is less preferred owing to frictional losses.

In the axial direction of the shaft, the sealing ring carrier and the adapter are preferably separated from each other by an at least slight, radially oriented gap that can be provided on both sides of the adapter, where the sealing rings bridge this gap by being pressed against the adapter and/or the sealing ring carrier. This enables at least slight axial displacement of the sealing ring carrier and the adapter relative to each other, which can go hand-in-hand with axial displacement of the shaft and the mount. This axial displacement can be compensated for by the sealing rings while maintaining their sealing action, and lead to expansion and/or compression of the respective sealing ring, which can be appropriately designed to this end, e.g. slit, or displays an area of thinner material. This makes it possible to accommodate tolerances of the sealing ring carrier and/or the adapter, or of the shaft and/or the mount, or slight axial displacement of the shaft relative to the mount during operation of the device or machine. This gap can merge into a wedge-shaped intermediate space between the adapter and the sealing ring carrier that widens towards the pressurized oil compartment and into which sealing rings with a wedge-shaped or triangular cross-section are inserted. The tip of the wedge or triangle of the sealing ring can face towards the gap. The gap (on both sides of the adapter in each case) can be ≤0.2-0.15 mm, for example, preferably ≤0.05-0.1 mm, particularly preferably ≤0.015-0.03 mm. This gap on either side of the adapter can have an axial width in the region of approx. $2/100$ to approx. $5/10$ mm, or up to approx. 1 mm, preferably $5/100$ to $3/10$ mm, more preferably $1/10$ to $2/10$ mm. The gap is preferably designed to be so small that the sealing ring carrier and/or the adapter are not tilted during their insertion into the space between the shaft and the mount. In general, the sealing rings can preferably be radially compressible and/or expandable, e.g. owing to a parting or assembly slit. In this context, the sealing rings can lie on the sealing ring carrier and/or the adapter under pre-stress. Thus, if the respective sealing ring displays an oblique sealing surface (positioned obliquely to a perpendicular to the shaft axis), the oil pressure forces it into the space between the sealing ring carrier and the adapter, thereby sealing the gap between these components. Axial displacement of the shaft and the mount relative to each other can thus be accommodated by compression and/or expansion of the sealing rings.

Radial displacement of the shaft and the mount relative to each other can occur in relation to the components as a whole or also only in certain areas, e.g. as a result of tolerances or imbalances. Radial displacement of this kind can be accommodated by one (preferably exactly one) of the opposite side faces of the sealing ring carrier and the adapter, preferably of the sealing ring carrier, lying virtually perpendicularly to the shaft axis, e.g. at an angle of ≤20-30°, preferably ≤5-10°, more preferably ≤2-3°, or approx. 0° to the perpendicular of the shaft axis, where this side face forms a sealing surface in relation to the sealing ring. The same can apply to the corresponding sealing surface of the sealing ring, which can be positioned on said side face in plane fashion. As a result, the sealing ring can be radially compressed and/or expanded while maintaining permanent, sealing contact with this surface.

The sealing ring carrier, which axially surrounds the outer side of the adapter and thus absorbs the axial forces acting on the rotary oil feedthrough, preferably consists of a material of higher strength and/or toughness than the adapter, e.g. a metallic material, such as a ferrous material (e.g. steel, high-grade steel), a light metal like an aluminum alloy, or similar. The component of lower strength (e.g. the adapter) can comprise a plastic material and be produced by an injection molding process, and can generally be of elastically deformable design, especially as regards radial deformation. The contact surface of the sealing ring on the lower-strength component of sealing ring carrier and adapter, e.g. on the adapter, can be larger than the sealing contact surface of the sealing ring on the higher-strength component, e.g. on the sealing ring carrier. In general, the rotational speed of the sealing ring relative to the lower-strength component can be lower than that relative to the higher-strength component.

The adapter can be partly recessed into the sealing ring carrier, where the recessed area provides a sealing surface in relation to the sealing ring. As a result, the axially outward-lying sealing ring carrier can absorb all the forces generated by the oil pressure. In general, the lower-strength component can thus be the adapter, which can be located in the shaft mount in non-rotating fashion, or in a manner permitting rotation with slip relative to its fastening component. The higher-strength component can be the sealing ring carrier, which can be fastened on the shaft in non-rotating fashion. Where appropriate, however, the higher-strength component or the sealing ring carrier can also be fixed on the mount in non-rotating fashion, and the adapter fixed on the shaft as the lower-strength component.

The rotary oil feedthrough can be designed in such a way that the cross-section of the sealing rings can in each case be located entirely within the cross-section or the cross-sectional contour of the sealing ring carrier that axially surrounds the outer side of the adapter. The sealing surface of the axially inward-lying component (e.g. of the adapter) in relation to the sealing ring can be located entirely within the cross-section of the cross-sectional contour of the axially outer-lying component (e.g. of the sealing ring carrier).

The sealing ring carrier can be designed as a cylinder with flanged flanks and at least essentially display a U-shaped profile, where the inner sides of the flanks can provide sealing surfaces in relation to the sealing ring. The sealing ring carrier can be of one-piece design, and particularly be designed as a formed sheet-metal part. The middle, cylindrical area of the sealing ring carrier can be fixable on the shaft (or also in the mount) in non-rotating fashion, preferably over its entire width, which can serve as a fastening surface or clamping surface in relation to the corresponding component. Under certain circumstances, the middle, cylindrical fastening area of the sealing ring carrier can also display radial projections, such as circumferential beads. The flanks of the sealing ring carrier can be disk-shaped or plane on the radially inner and/or outer side, although they can possibly also display structured cross-sections, e.g. bends or kinks, that can increase or reduce the width of the carrier in this area. As a result, the width of the fastening surface of the carrier can be dimensioned independently of the adapter width. The middle circumferential area of the sealing ring carrier can display one or more oil passage openings in order to connect the outer side of the carrier to the pressurized oil compartment in fluid-permeable fashion.

The adapter can display an essentially U-shaped cross-section, where the free face ends of the flanks can be designed as mating surfaces in relation to the mount (or in relation to the shaft, where appropriate). The transitional areas of the flanks towards the middle area of the adapter, or the radially inward-lying face ends of the flanks, can be designed on the outer side as sealing surfaces in relation to the sealing ring. However, the middle area of the adapter can generally also be radially separated from the radially inward and/or outward-lying face ends of its lateral flanks, such that an H-shape results, for example. Modified forms are also possible, such as an M-shape if the middle area is bent, etc. The middle area of the adapter can thus be radially separated from the fastening surface of the component retaining it, e.g. the mount. The middle area of the adapter can be partly or wholly accommodated by the sealing ring carrier. The middle area of the adapter can generally be provided with at least one or multiple oil passage openings, distributed around the circumference of the adapter, in order to connect the pressurized oil compartment to an oil duct possibly provided on the component to which the adapter is fastened in non-rotating fashion.

The fastening surfaces or clamping surfaces of the shaft and the mount are thus radial surfaces of the respective components that face towards each other.

The sides of the adapter facing towards the sealing ring carrier preferably display an area projecting laterally towards the sealing ring carrier. The radial extension of these projecting areas can be substantially smaller than the radial extension of the adapter, or of the area of the adapter accommodated in the cross-sectional area of the sealing ring carrier, e.g. ≤½-¼, preferably ≤⅛-1/16 thereof. The projecting lateral areas of the adapter are preferably only of linear design. The projecting areas prevent the respective outer side of the adapter from making plane contact with the inner sides of the sealing ring carrier when, for example, the sealing ring is slightly compressed, e.g. as a result of oil pressure fluctuations or tolerances of the components. Where appropriate, the projecting areas on one or both sides of the adapter can also lie on the inner sides of the radial flanks of the sealing ring carrier, thus minimizing frictional losses.

The mounting component for the shaft and/or the shaft is preferably made of a light metal material, e.g. aluminum or an aluminum alloy. The rotary oil feedthrough according to the invention is particularly adapted to a mount and/or shaft of this kind, since the non-rotating arrangement of the sealing ring carrier and the adapter on the respective components virtually rules out frictional losses, and thus also abrasion on the mount and/or the shaft. This particularly applies in the event of press-fitting of the sealing ring carrier and the mount. The fastening areas of the mount and/or the shaft can be designed in a special way, e.g. with a slightly different diameter and/or a different surface finish, such as the surface roughness, in order to assist press-fitting of the sealing ring carrier and the adapter. However, the fastening areas of the mount and the shaft preferably do not differ from the directly adjacent or contiguous areas of the respective components. Furthermore, it is not necessary for the fastening areas of the mount and the shaft for the rotary oil feedthrough to be surface-treated, e.g. surface-hardened or anodized.

The sealing ring carrier can be designed as a continuous component in the circumferential direction, preferably without circumferential areas of thinner material. The adapter can display an assembly slit or an area of thinner material, and be elastically deformable during assembly, e.g. compressible or expandable in the circumferential direction. The assembled adapter preferably sits on its fastening component (mount or shaft) under elastic pre-stress.

Distributed around their circumferences, the sealing ring carrier and/or the adapter can display at least one or multiple oil inlet bores, or generally oil passage openings, that connect an oil duct of the respective component to the pressurized compartment in fluid-permeable fashion.

The invention further relates to a machine or device, such as a transmission, with at least one rotary oil feedthrough according to the invention that is fastened on the shaft and the mount, where the shaft and/or the mount display at least one rotary oil feedthrough that is connected in fluid-bearing fashion to the rotary oil feedthrough or the space between the sealing ring carrier and the adapter (pressurized oil compartment).

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. The invention is described below on the basis of a practical example. The drawings show the following:

FIG. 2 is a perspective view (FIG. 2a), a side view (FIG. 2b), and a partial cross-section (FIG. 2c) of the sealing ring carrier of a rotary oil feedthrough according to FIG. 1;

FIG. 3 is a perspective view and a detail view (FIGS. 3a, 3b), a side view and a detail view (FIGS. 3c, 3d), and a partial cross-section (FIG. 3e) of an adapter of the rotary oil feedthrough according to FIG. 1; and FIG. 4 is a perspective view and a detail view (FIGS. 4a, 4b), a side view and a detail view (FIGS. 4c, 4d), a narrowside view (FIG. 4e), and a partial cross-section (FIG. 4f) of a sealing ring of the rotary oil feedthrough according to FIG. 1.

DETAILED DESCRIPTION OF THE INVENTION

Figure 1:
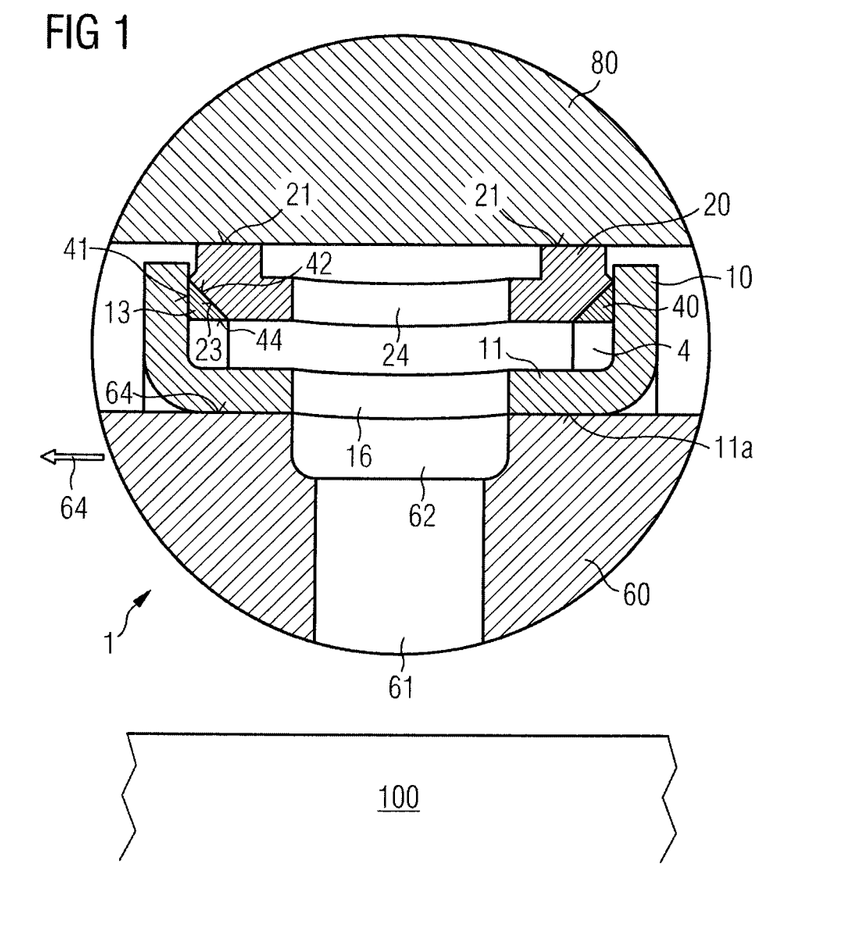
FIG. 1 is a cross-sectional representation of a rotary oil feedthrough according to an embodiment of the invention in assembled state.
Figure 2A:
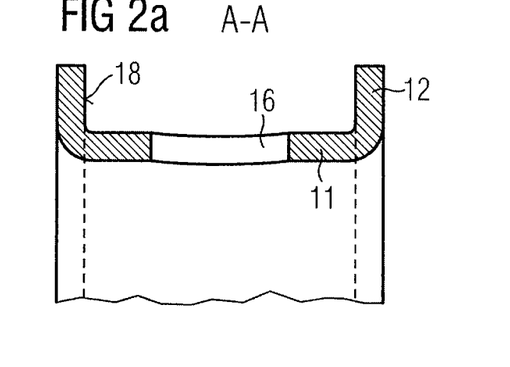
Figure 2B:
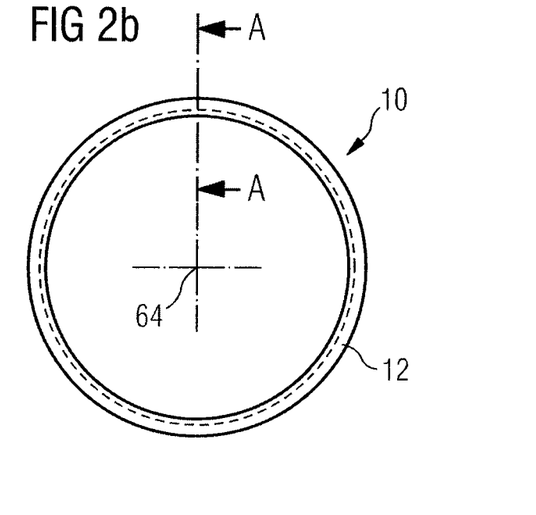
Figure 2C:
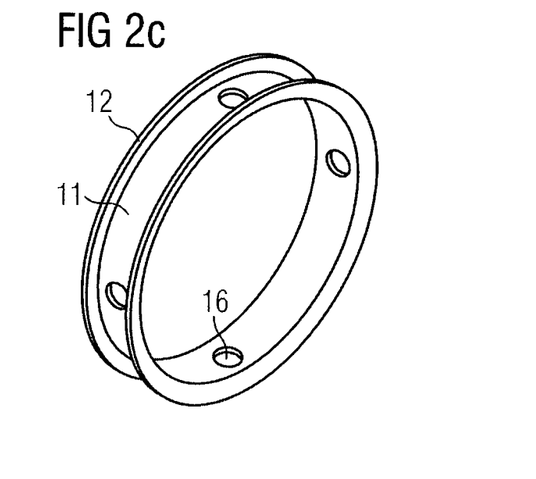
Figure 3A:
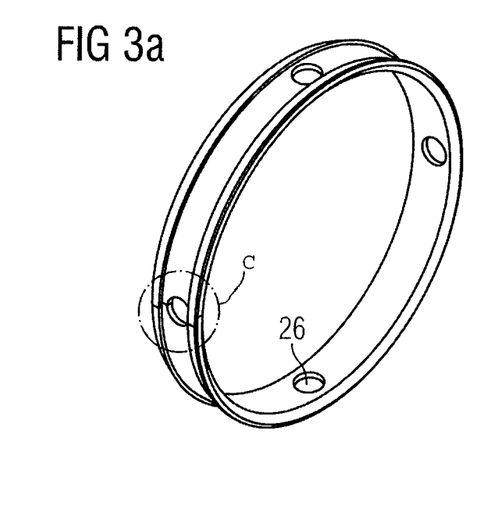
Figure 3B:
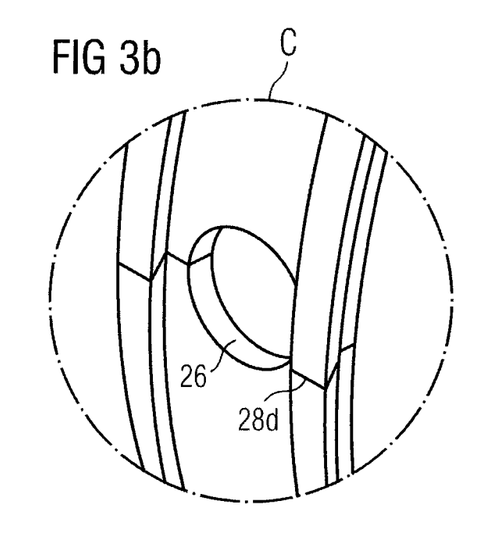
Figure 3C:
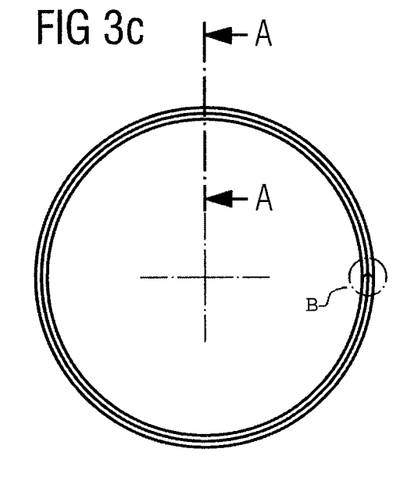
Figure 3D:
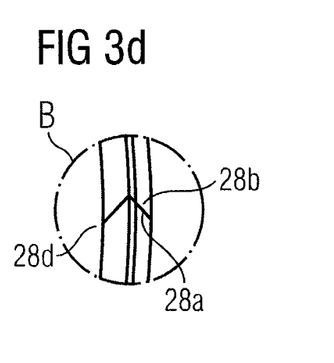
Figure 3E:
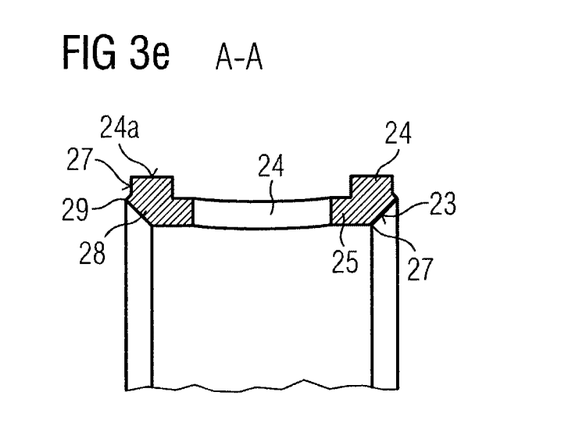
Figure 4A:
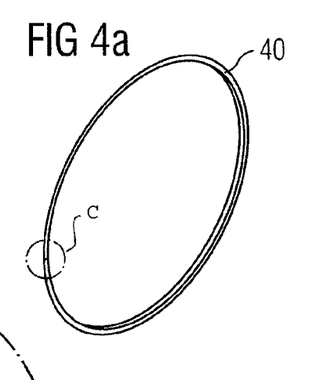
Figure 4B:
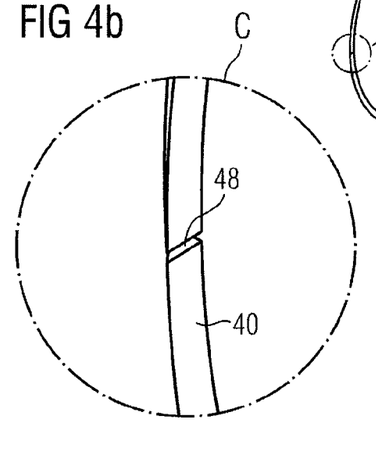
Figure 4C:
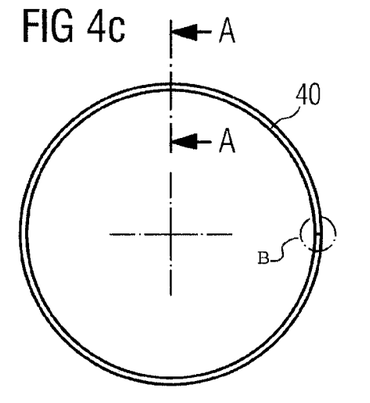
Figure 4D:
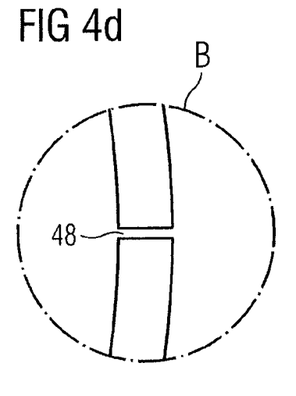
Figure 4E:
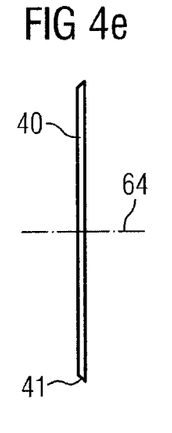
Figure 4F:
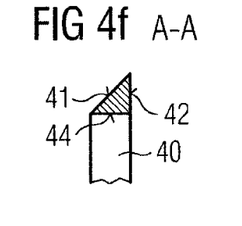

A rotary oil feedthrough 1 according to an embodiment of the invention can be used in a machine or device, such as transmission 100. The rotary oil feedthrough can be located between a rotatable shaft 60 and a shaft mount 80, where the oil-pressurizable pressure compartment 4 of the rotary oil feedthrough is connected in fluid-permeable fashion to an oil duct located in the shaft and/or the mount. According to the practical example, shaft 60 displays an oil duct 61 or an oil bore that can merge into a preferably circumferential oil groove 62 of the shaft. The rotary oil feedthrough seals off pressure compartment 4, pressurizable by oil pressure, on both sides in the axial direction of the shaft.

The rotary oil feedthrough according to the invention displays a discrete and monolithic sealing ring carrier 10, an adapter 20, and two sealing rings 40 that are located between sealing ring carrier 10 and adapter 20 and axially separated from each other. Sealing ring carrier 10 is located on the shaft in non-rotating fashion in this context, to which end it sits on radially outer fastening surface 64 of the shaft in a press fit. The clamping area of the sealing ring carrier can be its middle area 11, which can extend up to its two lateral radial flanks, or radial outer surface 11a of the middle area to be more precise. The clamped connection between sealing ring carrier and shaft is designed to be oil-tight under the operating conditions of the rotary oil feedthrough, preferably without further components being provided. To fix sealing ring carrier 10 in place on shaft 60, it can be slid onto the shaft in the axial direction and positioned in its target position. Radial deformation, e.g. radial compression (or radial expansion if located on the mount), is not necessary to produce the clamping action.

In turn, adapter 20 has a radially located fastening surface 21, located on the radially outer side in this instance, by which it is located on a radial fastening surface 81 on mount 80. Again, the adapter is preferably fastened on the mount exclusively by a clamping action, where the fastening or clamping area between adapter and mount is again designed to be fluid-tight, preferably solely as a result of the clamped connection. The clamped connection can be elastic. The clamped connection between adapter and mount can be established by sliding the adapter into the mount in axial direction 64 of the shaft. At least under certain operating conditions, the adapter can perform a certain degree of rotation relative to the mount (slip), insofar as a sufficiently fluid-tight connection to the mount (or to the shaft if the installation situation is different) is present, or it can be fixed in place in non-rotating fashion in the mount, where appropriate. The mount can generally be a housing or a hollow shaft.

Located between adapter 20 and sealing ring carrier 10 are two axially separated sealing rings 40, each of which lies with one sealing surface 41 on sealing ring carrier 10 and one sealing surface 42 on adapter 20. The sealing ring carrier and the adapter display corresponding sealing surfaces 13, 23. Sealing ring 40 is in each case not restricted to rectangular cross-section, as illustrated, but can also have a non-rectangular and/or non-isosceles cross-section. As a result, the distribution over the respective sealing surfaces of the sealing ring forces resulting from the oil pressure, and thus the relative speed of the sealing ring and the adapter, or of the sealing ring carrier, can be adapted to the respective requirements. Sealing surface 42 of sealing ring 40 (the hypotenuse in this case), interacting with adapter 20, preferably displays a larger contact surface than sealing surface 41, interacting with sealing ring carrier 10. The right angle faces towards pressure compartment 4 in this context. If the sealing ring is not rectangular, this angle can be less than or greater than 90°, e.g. in the range from 60-120°. Radially inward-lying surface 44 of the sealing ring can generally form the surface pressurized by the oil pressure, in order to press the sealing surface of the sealing ring against the adapter and the sealing ring carrier. The two sealing rings can generally be of identical design.

In this instance, sealing surfaces 13 of sealing ring carrier 10 are at least essentially perpendicular to axial direction 64 of the shaft, although they can, where appropriate, also enclose an angle of 45-135°, preferably 60-120°, particularly preferably 75-105°, or approx. 90°, with the axial direction of the sealing ring.

Sealing rings 40 are designed in such a way that, even at high rotational speeds and also in the upper rpm speed range of the respective device, they perform virtually no rotary relative motion in relation to adapter 20, or substantially less rotary relative motion than in relation to sealing ring carrier 10. This can be set accordingly via the cross-sectional geometry of the sealing ring.

Sealing ring carrier 10 and adapter 20 are designed as one-piece components that essentially consist of pairs of opposite side areas or flanks 12, 24, which can be of essentially annular or disk-shaped design, and a middle area 11, 25 connecting them, which can in each case be of essentially cylindrical design. Independently of each other, middle areas 11, 25 can be essentially located on the radial end areas of the side areas, such that the sealing ring carrier and the adapter in each case display an essentially U-shaped cross-section. The two U-sections can be inserted into each other with the same orientation relative to each other, such that the free face ends of the respective side areas point in the same direction. However, the middle area can in each case also be set back a distance from the radial ends of side areas 12, 24, such that an H-shaped cross-section essentially results. This can apply to the adapter, in particular.

On sealing ring carrier 10, middle area 11, located between the two lateral flanks, is designed as a clamping surface. On the adapter, free face ends 24a of the two side areas 24 are each designed as fastening or clamping surfaces. Where appropriate, the middle, cylindrical area of the adapter can also be offset relative to the corresponding fastening component, mount 80 in this instance, and serve as a radial clamping surface. It goes without saying that the sealing ring carrier and the adapter are generally radially separated from the other component of shaft and mount on which they are not fastened, preferably in non-rotating fashion.

The central areas between sealing ring carrier 10 and adapter 20 are in each case provided with oil passage openings 16, 26, which can be uniformly distributed over the circumference of the respective components 10, 20.

The two side areas or flanks 12 of sealing ring carrier 10 laterally surround adapter 20, such that the adapter reaches into the cross-sectional area of the sealing ring carrier, or is partly inserted in the sealing ring carrier. Sealing ring carrier 10 thus also laterally surrounds sealing surfaces 23 of the adapter that can be positioned against sealing rings 40. In this context, sealing ring carrier 10 is made of a material that is compression-proof and non-deformable under the operating conditions of the rotary oil feedthrough, e.g. a metal. All axial forces, particularly axial forces due to the oil pressure, that are exerted directly on the sealing ring carrier, or also by the adapter on the sealing ring carrier, can thus be completely absorbed by the dimensionally stable sealing ring carrier.

In the area of ends 27 of its side areas 24 that project into the pressure compartment, adapter 20 can display sealing surfaces 23 that come into sealing contact with the two sealing rings 40. According to the practical example, transitional area 28 between lateral flanks 24 or the legs of the adapter and middle cylindrical area 25 is designed as a sealing surface 23 to this end. Sealing surfaces 13 of sealing ring carrier 10 opposite sealing rings 40 can in each case be located on inner side 18 of lateral flanks 12 of the sealing ring carrier.

Side areas 24 of adapter 20 can be slightly separated from inner sides 18 of side areas or flanks 12 of the sealing ring carrier in the axial direction, to which end preferentially circumferential areas 29, projecting in the direction of inner sides 18 of the flanks of the sealing ring carrier, can be provided on axially outer-lying side surfaces 27 of the adapter. Projecting areas 29 of the adapter can lie on inner sides 18 of sealing ring carrier flanks 12, or preferably be slightly separated from them. The gap between the adapter and the sealing ring carrier can in each case be bridged by the sealing ring. The adapter can (if shaft and mount allow, or in dismantled state but installed configuration of the rotary oil feedthrough) be capable of radial displacement relative to the sealing ring carrier, to which end the sealing rings can be compressed and/or expanded by the oil pressure, for which purpose they are provided with slits dividing the circumference. Owing to their geometry, the sealing rings are centered between the adapter and the sealing ring carrier by the oil pressure.

Sealing ring carrier 10 can be designed as a continuous component around its circumference. Adapter 20 and, independently thereof, the two sealing rings 40 can in each case display an assembly groove 28, 48 that divides the respective component in the circumferential direction. As a result, adapter 20 can be more easily fixed in place in the mount in a press fit, and the sealing rings can be more easily fitted in their target position. The diameter of adapter 20 can be dimensioned in such a way that it is located independently in mount 80 under pre-stress. Assembly groove 28d, dividing the adapter, can be designed in the form of a slit 28d, preferably in the manner of a labyrinth seal, to which end the two face ends 28a, b of the adapter ring, separated by the assembly groove, can be designed with a receding and a projecting angle. At least one of the flanks of the V-shaped slit 28d can thus lie in sealing fashion on the corresponding flank of the opposite face end. Assembly groove 28d of the adapter can be located in the area of an oil passage opening 26. Sealing rings 40 can in each case likewise display an assembly gap 48, which additionally permits expansion or compression of the sealing rings, as well as centering of the adapter. Where appropriate, assembly gap 48 of the sealing rings can also be provided with a labyrinth seal in each case.

Sealing ring carrier 10 can be manufactured from metal or a compression-proof, e.g. fiber-reinforced, plastic, particularly as a formed sheet-metal part. Adapter 20 and/or sealing rings 40 can be manufactured from a preferably elastically deformable plastic material, e.g. by the injection molding method. Shaft 60 and mount 80 can consist of a light metal material, e.g. aluminum or an aluminum alloy, that need not be surface-treated or surface-hardened.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. An assembly comprising:
   a rotatable shaft;
   a shaft mount; and
   a rotary oil feedthrough sealing off a pressurized oil compartment between the rotatable shaft and the mount, the rotary oil feedthrough comprising a radial oil passage connecting an oil duct of the shaft or the mount to the pressurized oil compartment in fluid-permeable fashion, a seal arrangement sealing off the pressurized oil compartment on both sides in an axial direction of the shaft, a discrete and monolithic sealing ring carrier fastened to the shaft or the mount in non-rotating and fluid-tight fashion, the sealing ring carrier being arranged co-axially to the shaft or the mount, and an adapter positioned on the other one of the shaft and the mount in fluid-tight fashion, the adapter being surrounded laterally by the sealing ring carrier in the axial direction of the shaft, and two axially separated sealing rings located between the sealing ring carrier and the adapter, each of the sealing rings displaying sealing surfaces lying on the sealing ring carrier and the adapter in sealing fashion, thereby sealing off the pressurized oil compartment in the axial direction of the shaft, and the sealing rings being rotatable relative to the sealing ring carrier or to the adapter or relative to both, each sealing ring being provided with a slit dividing a circumference thereof, wherein:
   the adapter has an assembly slit dividing a circumference thereof and the sealing ring carrier is radially positioned between each sealing ring and one of the shaft and the mount,
   at least a radially inner side of the sealing rings, faces toward the shaft is pressurized by the oil pressure, thereby pressing each sealing ring against the sealing surfaces thereof, and
   the sealing surface of each of the sealing rings which interacts with the adapter is arranged at an angle to the sealing surface of the sealing ring which interacts with the sealing ring carrier.

2. The assembly according to claim 1, wherein the sealing ring carrier is fastened on the shaft or in the mount in non-rotating fashion in a press fit.

3. The assembly according to claim 1, wherein the adapter is fastened in the mount or on the shaft in a press fit.

4. The assembly according to claim 1, wherein the sealing ring carrier or the adapter or both are adapted to be fastened on the respective component of shaft and mount by sliding axially onto the shaft or sliding axially into the mount.

5. The assembly according to claim 1, wherein two sealing surfaces of the respective sealing ring enclose an angle of 30-60°.

6. The assembly according to claim 1, wherein the two sealing rings each have a triangular cross-section, wherein a largest cross-sectional side of each sealing ring lies on the adapter in sealing fashion, and a cross-sectional side located on an outer side of each sealing ring lies on the sealing ring carrier in sealing fashion.

7. The assembly according to claim 1, wherein each of the sealing rings and sealing surfaces of the sealing ring carrier and adapter lying opposite the sealing rings have a form such that, when the shaft rotates, each sealing ring displays a lower relative rotational speed in relation to the adapter than in relation to the sealing ring carrier, or at least essentially does not rotate relative to the adapter.

8. The assembly according to claim 1, wherein the sealing ring carrier and the adapter fit into each other, and wherein the sealing ring carrier surrounding the adapter has a form of a cylinder with flanged flanks, wherein inner sides of the flanks provide sealing surfaces in relation to the sealing rings.

9. The assembly according to claim 1, wherein the adapter has two opposite flanks and a connecting area, wherein free face ends of the flanks form contact surfaces in relation to the mount or the shaft, and wherein an outer side of the transitional area of the flanks towards a middle area of the adapter forms a sealing surface in relation to the sealing rings.

10. The assembly according to claim 1, wherein the adapter has an essentially U-shaped cross-section.

11. The assembly according to claim 1, wherein sides of the adapter facing toward the sealing ring carrier have an area projecting laterally toward the sealing ring carrier.

12. The assembly according to claim 1, wherein a wedge-shaped intermediate space is present between the adapter and the sealing ring carrier, the intermediate space widening toward the pressurized oil compartment and into which the sealing rings having a wedge-shaped or triangular cross-section are inserted, wherein the sealing rings are radially compressible or expandable or both.

13. The assembly according to claim 1, wherein the adapter comprises a plastic material or the sealing ring carrier comprises a metallic material or both.

14. The assembly according to claim 1, wherein the sealing ring carrier is continuous in a circumferential direction.

15. The assembly according to claim 1, wherein the mount or the shaft or both comprise aluminum or another lightweight-material, and wherein fastening surfaces of the shaft or mount interacting with the sealing ring carrier and the adapter are not surface-treated.

16. The assembly according to claim 2, wherein the adapter is fastened in the mount or on the shaft in a press fit.

17. The assembly according to claim 2, wherein at least one of the sealing ring carrier and the adapter is fastened on the respective component of shaft and mount by sliding axially onto the shaft or sliding axially into the mount.

18. The assembly according to claim 2, wherein the two sealing surfaces of the respective sealing ring enclose an angle of 30-60°.

19. The assembly according to claim 2, wherein the two sealing rings each have a triangular cross-section, wherein a largest cross-sectional side of each sealing ring lies on the adapter in sealing fashion, and a cross-sectional side located on an outer side of each sealing ring lies on the sealing ring carrier in sealing fashion.

20. The assembly according to claim 2, wherein each of the sealing rings and sealing surfaces of the sealing ring carrier and adapter lying opposite the sealing rings have a form such that, when the shaft rotates, each sealing ring displays a lower relative rotational speed in relation to the adapter than in relation to the sealing ring carrier, or at least essentially does not rotate relative to the adapter.

21. The assembly according to claim 2, wherein the sealing ring carrier and the adapter fit into each other, and wherein the sealing ring carrier surrounding the adapter has a form of a cylinder with flanged flanks, wherein inner sides of the flanks provide sealing surfaces in relation to the sealing rings.

22. The assembly according to claim 2, wherein the adapter has two opposite flanks and a connecting area, wherein free face ends of the flanks form contact surfaces in relation to the mount or the shaft, and wherein an outer side of the transitional area of the flanks towards a middle area of the adapter forms a sealing surface in relation to the sealing rings.

23. The assembly according to claim 2, wherein the adapter has an essentially U-shaped cross-section.

24. The assembly according to claim 2, wherein sides of the adapter facing toward the sealing ring carrier have an area projecting laterally toward the sealing ring carrier.

25. The assembly according to claim 2, wherein a wedge-shaped intermediate space is present between the adapter and the sealing ring carrier, the intermediate space widening toward the pressurized oil compartment and into which the sealing rings having a wedge-shaped or triangular cross-section are inserted, wherein the sealing rings are radially compressible or expandable or both.

26. The assembly according to claim 2, wherein the adapter comprises a plastic material or the sealing ring carrier comprises a metallic material or both.

27. The assembly according to claim 2, wherein the sealing ring carrier is continuous in a circumferential direction.

28. The assembly according to claim 2, wherein the mount or the shaft or both comprise aluminum or another lightweight-material, and wherein fastening surfaces of the shaft or mount interacting with the sealing ring carrier and the adapter are not surface-treated.

* * * * *